US005233740A

United States Patent [19]

Chen

[11] Patent Number: 5,233,740

[45] Date of Patent: Aug. 10, 1993

[54] HYDRAULIC PULLER

[76] Inventor: Jui-Nien Chen, 180-10, Hai-Pin Rd., Chingshui Town, Taichung Hsien, Taiwan

[21] Appl. No.: 900,453

[22] Filed: Jun. 18, 1992

[51] Int. Cl.[5] .......... B23P 19/04

[52] U.S. Cl. .......... 29/252

[58] Field of Search .......... 29/261, 252; 254/420, 254/93 H, 93 R

[56] References Cited

U.S. PATENT DOCUMENTS

| | | | |
|---|---|---|---|
| 2,003,756 | 6/1935 | Nagel | 29/252 |
| 2,352,390 | 6/1944 | Kirkland | 254/93 M |
| 2,484,129 | 10/1949 | Taylor | 29/261 |

FOREIGN PATENT DOCUMENTS

| | | | |
|---|---|---|---|
| 2472099 | 12/1979 | France | 29/252 |

*Primary Examiner*—Robert C. Watson
*Attorney, Agent, or Firm*—Varndell Legal Group

[57] ABSTRACT

For removing a bearing or axle bushing from an axle, a hydraulic puller comprising a pawl assembly mounted on a hydraulic pipe, an oil container attached to the hydraulic pipe at the top, a movable rod movable fastened in the hydraulic pipe at the bottom, a piston rod controlled by a hand lever to squeeze a hydraulic oil out of the oil container for moving the movable rod, and a spring to automatically push the movable rod back to its original position. Repeatedly rotating the hand lever back and forth causes the movable rod to extend out of the hydraulic pipe, and therefore, the pawl assembly is forced to pull a bearing or axle bushing out of an axle.

1 Claim, 6 Drawing Sheets

HYDRAULIC PULLER

BACKGROUND AND SUMMARY OF THE INVENTION

The present invention relates to pullers and relates more particularly to a hydraulic puller used in removing bearings or axle bushings from axles.

In removing a bearing or axle bush from an axle, the rust must be knocked off so that a bearing or axle bushing can be removed from place. However, a bearing, axle bush or the axle itself may be damaged easily while knocking off the rust. FIG. 1 illustrates a puller accomplished to eliminate the aforesaid problem. The puller comprises two symmetrical pawls mounted on a screw rod. However, this puller is still not satisfactory in use. Because the rotating of the screw rod consumes much labor, it may require two operators to operate the puller in an operation. While the screw rod is rotated, the axle to which the screw rod is stopped may be caused to rotate simultaneously, and therefore, a third operator may be required to hold the axle in position. Because the pawls are moved on the screw rod by the rotating of the thread of the screw rod, the moving speed of the pawls on the screw rod is very slow. Further, much working space is needed for rotating a spanner to drive the screw rod, and therefore, the puller is not convenient for use in a narrow working space.

The present invention has been accomplished to eliminate the aforesaid disadvantages and problems. It is therefore the main object of the present invention to provide a hydraulic puller for removing a bearing or axle bushing from an axle, which can be conveniently operated by one operator with minimum labor.

According to the present invention, a hydraulic puller for removing a bearing or axle bush from an axle is generally comprised of a hydraulic pipe, a pawl assembly mounted on said hydraulic pipe for catching the element to be removed, a hydraulic oil container attached to said hydraulic pipe, a movable rod fastened in said hydraulic pipe to stop the axle from which said element is to be removed, and a piston controlled by a hand lever to compress hydraulic pipe out of said hydraulic oil container, wherein repeatedly rotating said hand lever back and forth causes said movable rod to extend out of said hydraulic pipe so that said pawl assembly is forced to carry the element out of the axle.

DETAILED DESCRIPTION OF THE PREFERRED EMBODIMENT

Figure 1:
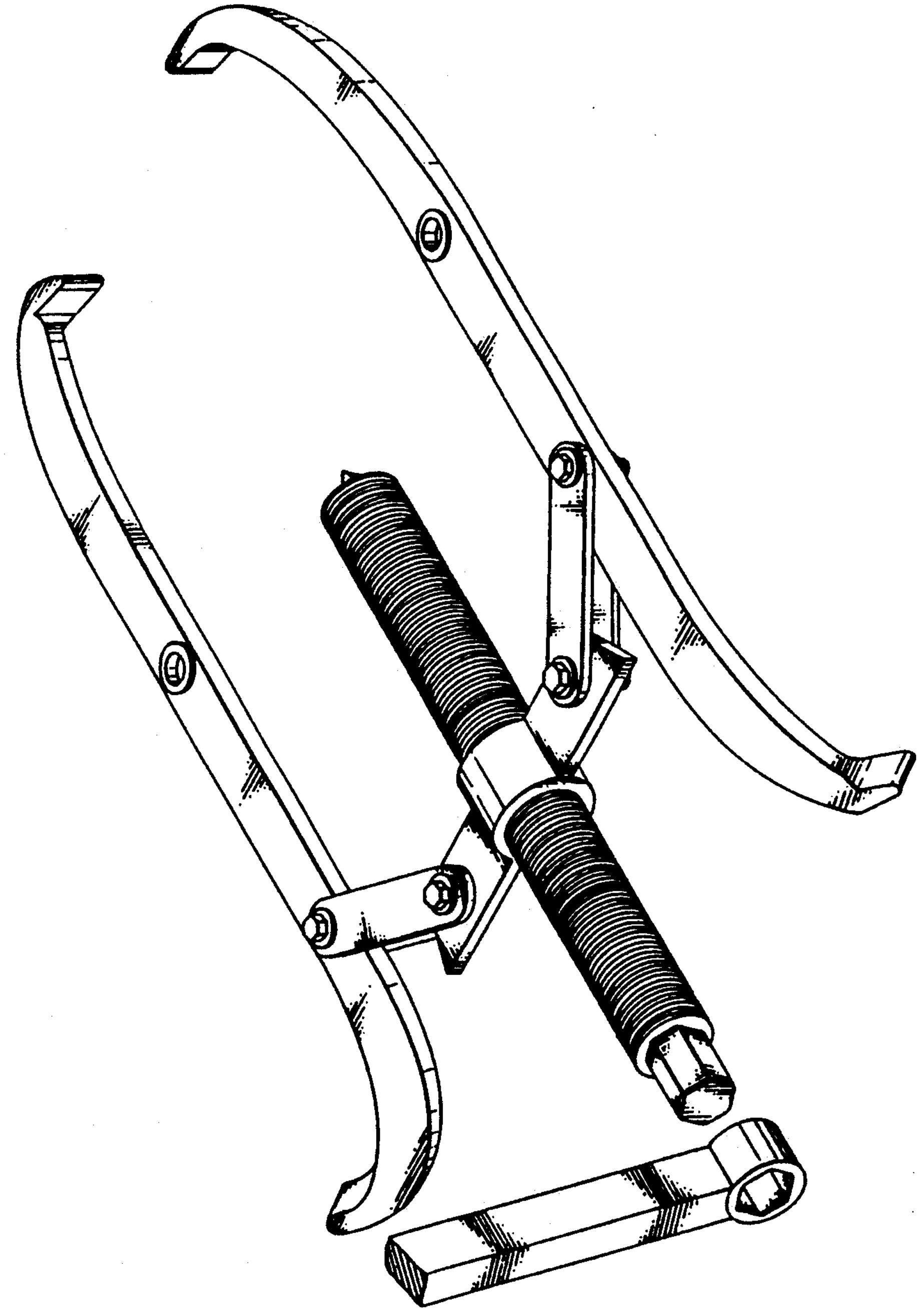
Fig. 1 PRIOR ART
FIG. 1 is a perspective view of a prior art puller.
Figure 2:
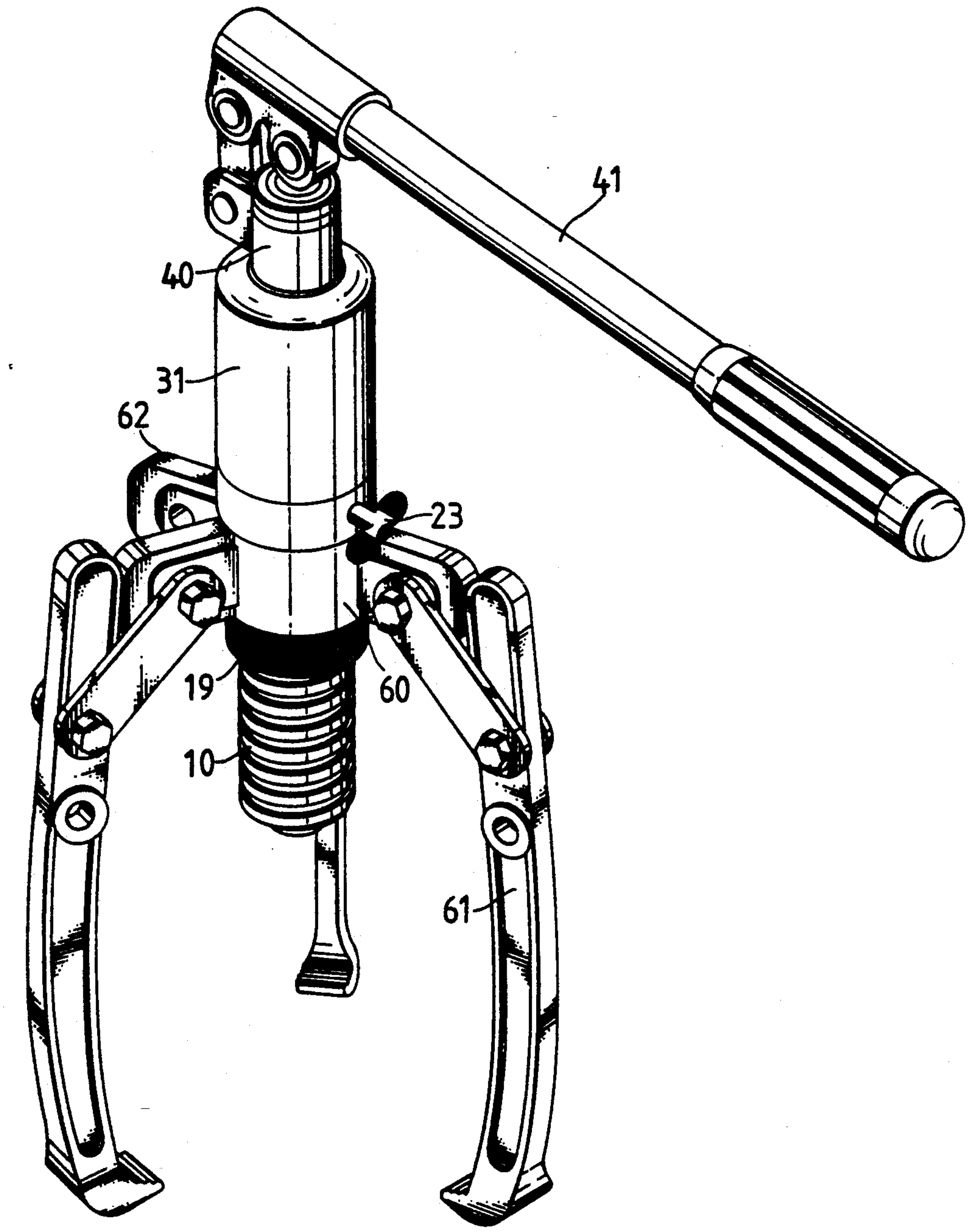
FIG. 2 is a perspective view of the preferred embodiment of the present invention.
Figure 3:
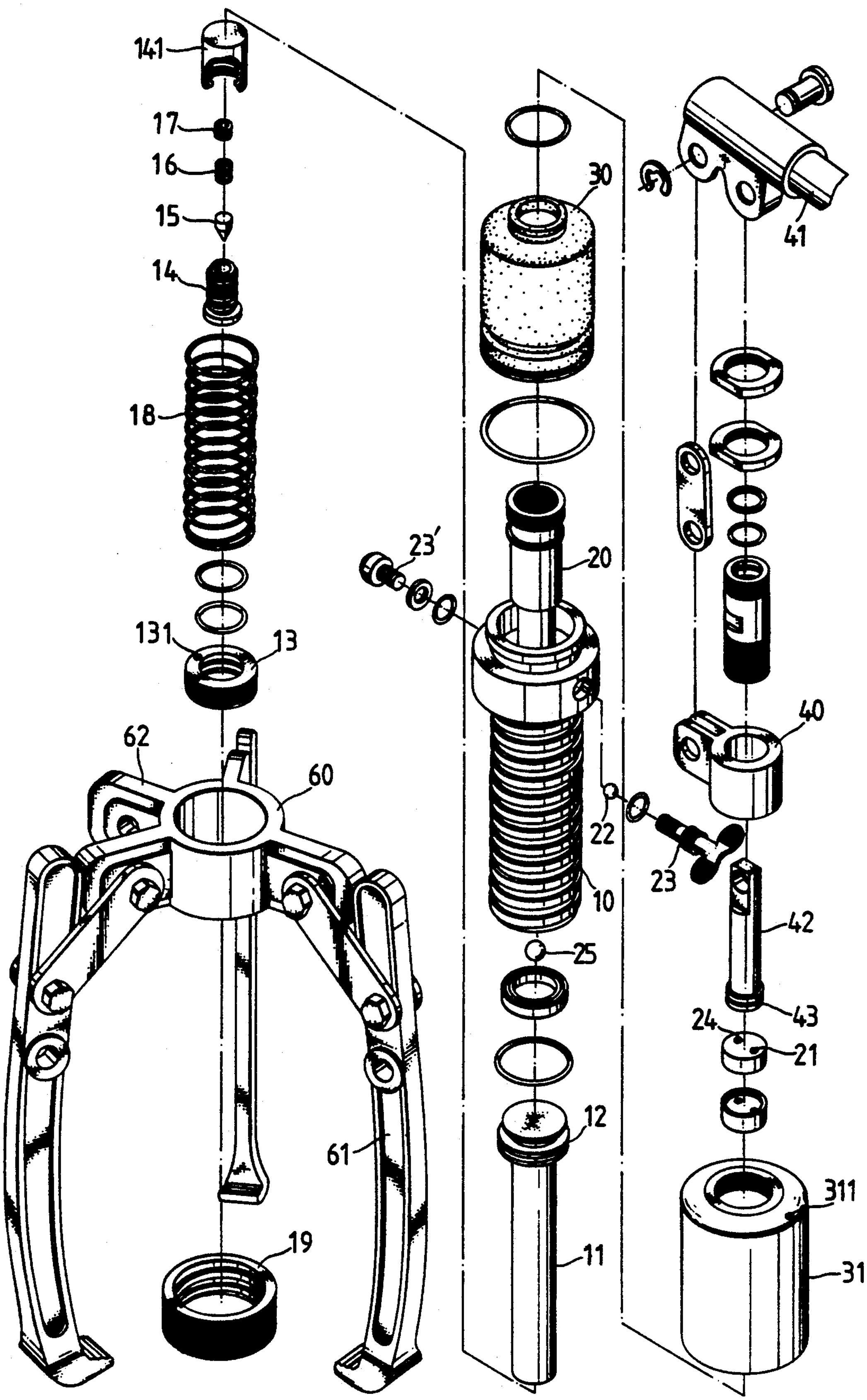
FIG. 3 is an exploded perspective view of the preferred embodiment of the present invention.
Figure 4:
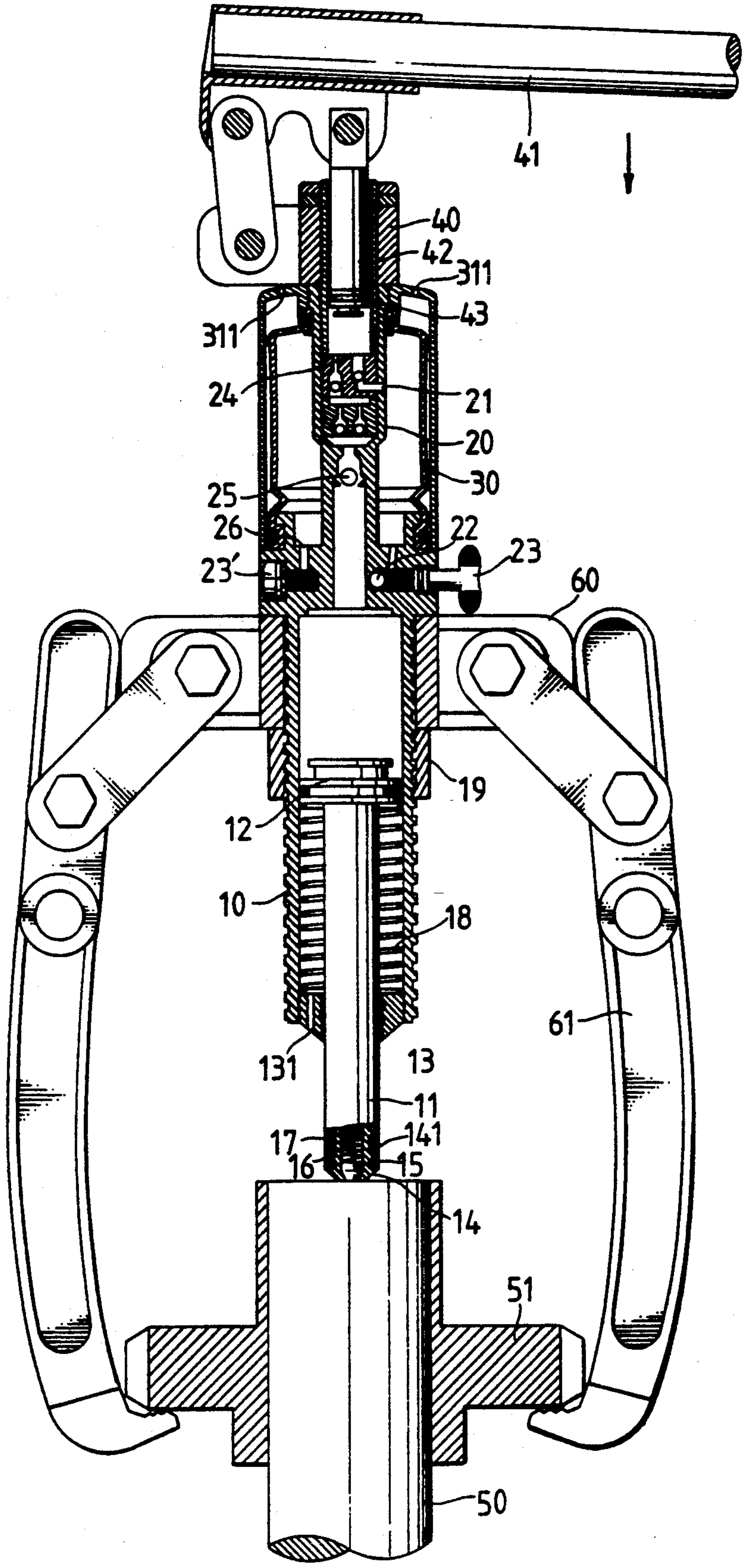
FIG. 4 is a cross section showing that rotating the hand lever downwards causes the movable rod to move downwards relative to the pawl assembly.

Referring to FIGS. 2, 3 and 4, a hydraulic pipe 10 is fastened in pawl assembly 60. The pawl assembly 60 has a plurality of pawls 61 and an additional pawl seat 62 opposite to either one of the pawls 61 for changing their position. The hydraulic pipe 10 has a movable rod 11 and a compression spring 18 inserted therein, wherein the compression spring 18 is sleeved on the movable rod 11. The movable rod 11 has an oil sealing ring 12 which divided the internal space of the hydraulic pipe 10 into two separate, closed chambers. The hydraulic pipe 10 has a unitary connecting pipe 20 at permeable oil container 30. The air permeable oil container 30 is covered by a casing 31 which has two air holes 311 at the top for air in and out during the operation of the present invention. The connecting pipe 20 of the hydraulic pipe 10 has an oil return hole 21 and associated check valve fastened with a valve 22 controlled by a screw 23, an oil outlet hole 24 and associated check valve, and an oil filling hole 26 sealed by a screw 23. There is also provided a holder plate 40 attached to the connecting pipe 20 at the top to firmly retain the casing 31 in place, and a hand lever 41 pivoted to said holder plate 40 and driven to alternatively move a piston rod 42 up and down. The piston rod 42 has a piston ring 43 on the bottom end thereof. Moving down the piston rod 42 causes the piston ring 43 to squeeze a hydraulic oil out of the oil container 30 only through the oil outlet hole 24 and the check valve associated therewith into the hydraulic pipe 10 for moving the movable rod 11. Inside the hydraulic pipe 10, there is provided a check valve 25 fastened between the bottom edge of the connecting pipe 20 and the top edge of the movable rod 11 to prohibit the hydraulic oil from flowing backwards during the operation of the wrench. After the pawl assembly 60 has been mounted on the hydraulic pipe 10, a lock nut 19 is externally fastened on the hydraulic pipe 10 to firmly secure the pawl assembly 60 in place, and a stop ring 13 which is externally threaded is screwed into the hydraulic pipe 10 at the bottom to stop the movable rod 11 from disconnecting from the hydraulic pipe 10. The stop ring 13 has an exhaust hole 131 for exhausting compressed air during the down stroke of the movable rod 11. The movable rod 11 has a bottom end fixedly attached with socket 141 which is screwed up with a hollow screw means 14 to hole a cone 15, a spring 16 and a bolt 17 and a spring 16.

Figure 5:
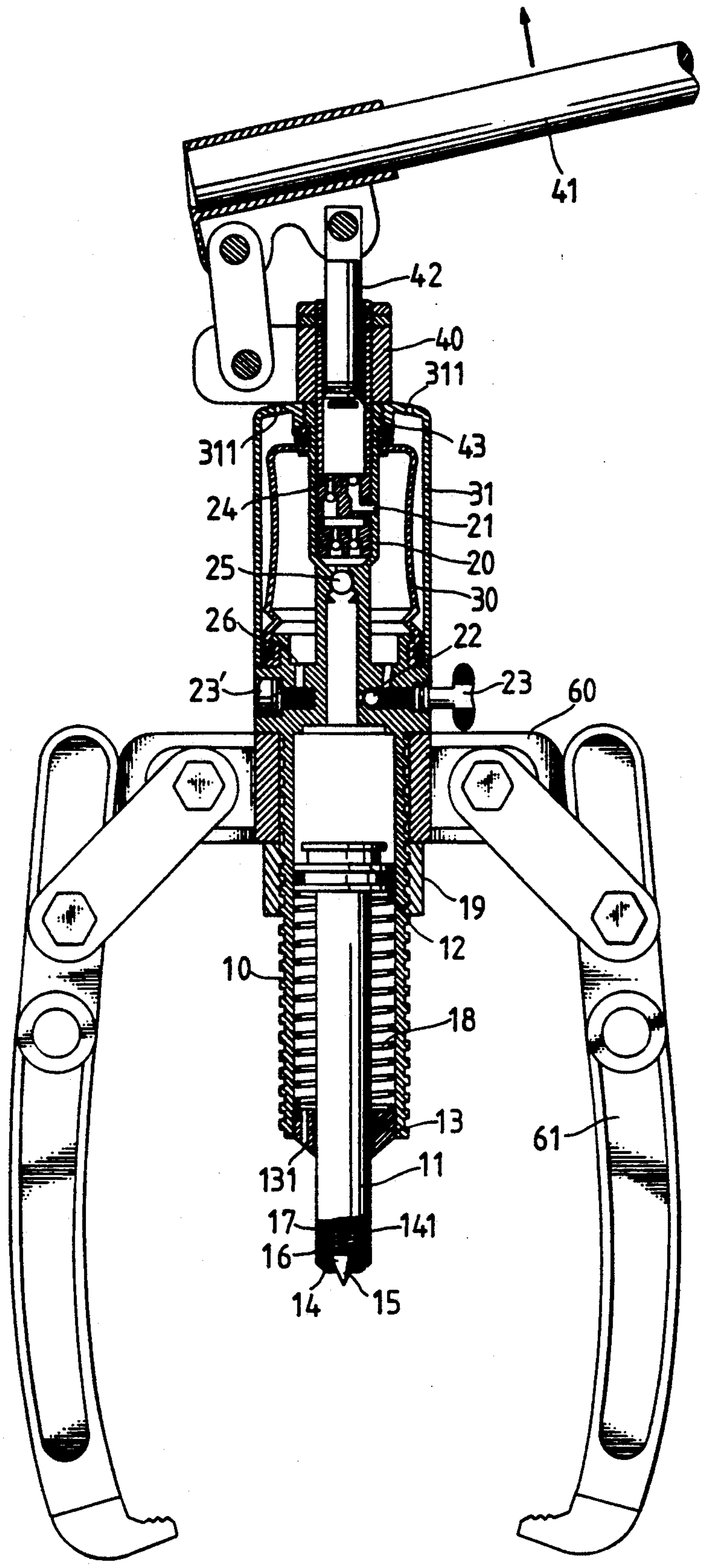
FIG. 5 is another cross section showing that the hand lever is lifted to let the hydraulic oil flow into the chamber below the piston rod.
Figure 6:
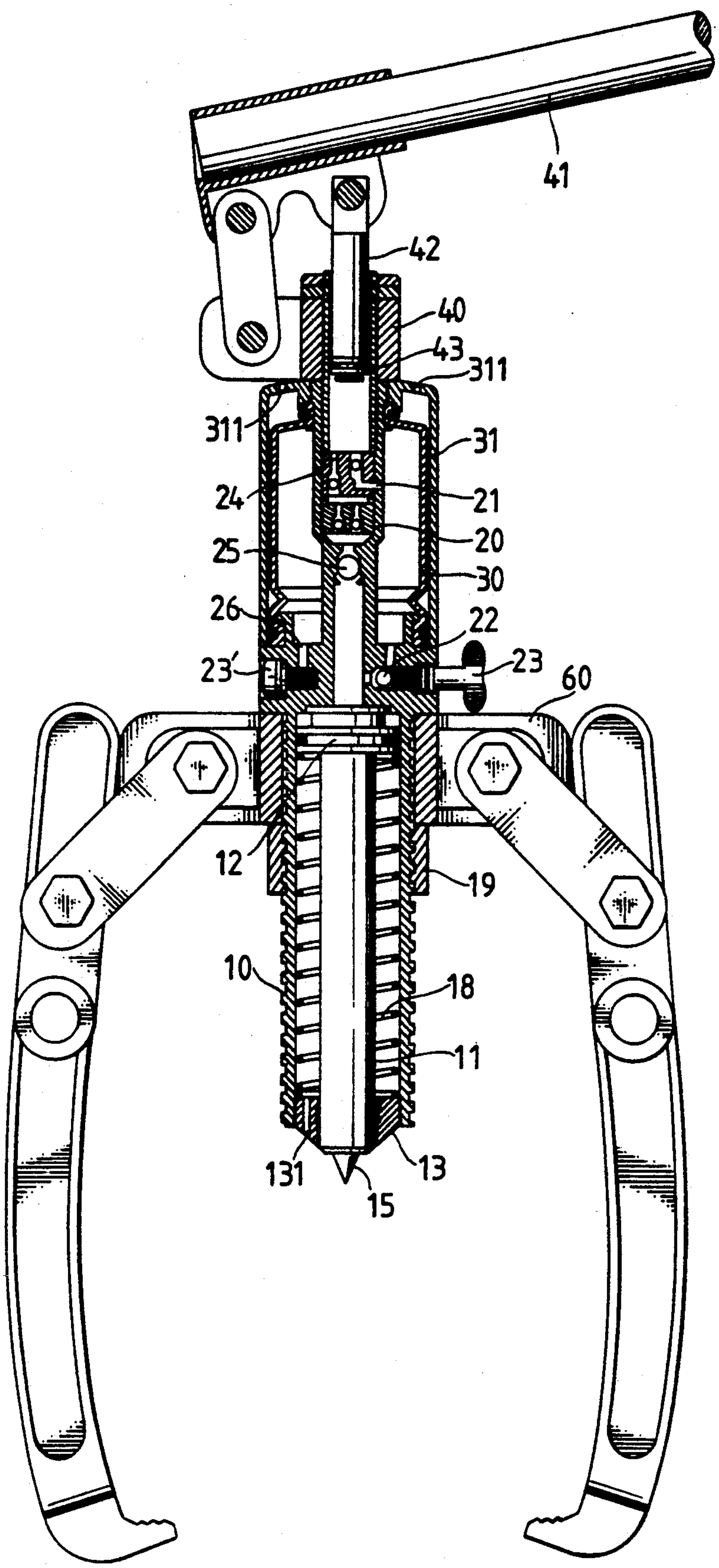
FIG. 6 is still another cross section showing that the oil return valve control screw is loosened to let the hydraulic oil flow back into the oil container.

Referring to FIG. 4, the movable rod 11 is extended out of the hydraulic pipe 10 with the cone 15 stopped against the axle 50 (from which an element 51 is to be detached), and the pawls 61 are respectively hooked on the element 51 to be detached from the axle 50. Then, the hand lever 41 is rotated downwards causing the piston ring 43 to squeeze the hydraulic oil out of the oil container 30 through the oil outlet hole 24 into the hydraulic pipe 10, and therefore, the movable rod 11 is squeezed downwards by the pressure from the hydraulic oil causing the pawl assembly 60 to move upwards relatively to the movable rod 11. Then, the hand lever 41 is lifted to release the piston rod 42 from the oil container 30 (see FIG. 5). when the piston rod 42 is released from the oil container 30, the hydraulic oil is induced to flow only through the oil return hole 21 and the check valve associated therewith into the chamber below the piston ring 43 for next squeezing operation. Therefore, repeatedly rotating the hand lever 41 back and forth causes the pawls 61 of the pawl assembly 60 to remove the element 51 out of the axle 50. After the removal of the element 51 from the axle, the screw 23 is loosened, see FIG. 6, to let the hydraulic oil flow through the oil return valve 22 back into the oil container 30.

I claim:

1. A hydraulic puller for removing an element from an axle, which comprises:

a hollow pipe, a pawl means mounted on said hollow pipe for grasping an element to be removed from an axle;

a movable rod secured in said hollow pipe at a lower portion of said hollow pipe by an oil sealing ring at a top of said movable rod and a stop ring arranged at a bottom of said hollow pipe, said movable rod being movable within said hollow pipe and said oil sealing ring defining a fluid tight chamber in an upper portion of said hollow pipe, a spring means arranged between said oil sealing ring and said stop ring for biasing said movable rod in a direction for reducing volume of said fluid tight chamber;

said movable rod having a socket on a bottom end thereof, a hollow screw threadedly tighten in said socket and holding a cone, a bolt threadedly tighten in said hollow screw and holding a supporting spring, said supporting spring biasing said cone to partly protruded beyond said hollow screw;

a piston rod means controlled by a hand lever for moving said hydraulic oil from said oil container and to said fluid tight chamber under pressure and causing downward movement of said movable rod out of said hollow pipe;

a connecting pipe means connecting an oil tank assembly, said hollow pipe and said piston rod means; said pipe connecting means interposed between said piston rod means and said hollow pipe, said piston rod means and said pipe connecting means arranged above said hollow pipe and along a longitudinal axis of said hollow pipe; said oil tank assembly arranged circumferentially about said connecting pipe means; said oil tank assembly comprising an air permeable oil container filled with a hydraulic oil and covered by a casing, said casing having two air holes at two opposite locations; said connecting pipe means having an oil outlet hole with an associated check valve for only feeding said hydraulic oil from said piston rod means to said fluid tight chamber and an oil return hole with an associated check valve for only feeding said hydraulic oil from said oil container to said piston rod means;

said connecting pipe means further including a release value and a screw controlling said release valve interposed between said fluid tight chamber and said oil container, said release valve returning said hydraulic oil from said fluid tight chamber to said oil container by action of said spring means when said release valve is opened, said screw controlling the opening and closing of said release valve, wherein repeated rotating of said hand lever back and forth causes said movable rod to extend out of said hollow pipe step by step so that said element can be pulled out of said axle by said pawl means, and opening of said release valve automatically returns said movable rod to its original position.

* * * * *